United States Patent [19]

Gavin

[11] Patent Number: 4,832,846

[45] Date of Patent: May 23, 1989

[54] SEPTIC TANK BAFFLE

[76] Inventor: Norman W. Gavin, 2545 Ridge Rd., North Haven, Conn. 06473

[21] Appl. No.: 228,389

[22] Filed: Aug. 4, 1988

[51] Int. Cl.⁴ .......................... B01D 21/00; C02F 1/40
[52] U.S. Cl. .................................. 210/532.2; 210/137; 210/232; 210/534; D23/203
[58] Field of Search ............... 210/137, 170, 206, 232, 210/519, 532.2, 542, 534, 536; 134/182, 183; D23/203, 206

[56] References Cited

U.S. PATENT DOCUMENTS

| 2,143,248 | 1/1939 | Otto | 210/532.2 |
|---|---|---|---|
| 3,630,370 | 12/1971 | Quina | 210/532.2 |
| 3,817,864 | 6/1974 | Carlson et al. | 210/532.2 |
| 3,826,376 | 7/1974 | Carlson et al. | 210/519 |
| 4,334,991 | 6/1982 | Beede | 210/232 |
| 4,363,732 | 12/1982 | Crates et al. | 210/532.2 |

Primary Examiner—Frank Spear
Assistant Examiner—Joseph Drodge
Attorney, Agent, or Firm—Robert A. Seemann

[57] ABSTRACT

A baffle includes a conduit and a flow director flap portion. The conduit includes, at its front, a curved wall generated on an axis running the length of the conduit. One pair each of two pairs of angled walls, extending the length of the conduit, is attached to each side of the curved wall by a free edge of one of the pair, the other edge of the pair being attached to a wall for mounting, the wall having holes for mounting the baffle to a concrete septic tank wall, over a port in the tank wall. The angled walls are preferably perpendicular to each other and to the wall for mounting, the two walls formounting being coplanar and at the back of the conduit. The flow director portion includes two angled walls, one is for attaching the portion to the back of the conduit, the other extends over the end of the conduit and has a surface that is further from the curved wall than it is from the paired walls when the flow director portion is attached to the conduit. The baffle is mounted vertically to the tank wall by fasteners which are inserted through the holes that are near the top of the conduit, and into anchors which are molded into the tank wall in a pattern for matching the holes and positioning the baffle over the port.

7 Claims, 2 Drawing Sheets

SEPTIC TANK BAFFLE

BACKGROUND OF THE INVENTION

1. Field of the Invention

The invention relates to gravitational separators for liquid purification, more specifically to a baffle for the inlet and outlet ports of a septic tank.

2. Description of the Prior Art

A baffle is necessary at the outlet port of a septic tank, within the tank, to reduce the percentage of solid particulate matter in the liquid that exits the tank by way of the outlet port. The baffle generally reduces the percentage by directing the matter away from the outlet port, and by slowing or otherwise disturbing liquid flow to the port so that the effect of gravity on the particles is greater than the effect of the current which would otherwise carry them out of the tank.

A baffle is advisable at the inlet port of a septic tank, within the tank, to prevent flow across the top of the tank and to direct flow downward and across the length of the tank. This brings fresh microbes to the sludge at the bottom of the tank and stirs it, contributing to the fermentation of waste material in the tank.

U.S. Pat. No. 2,143,248, patented Jan. 10, 1939, by L. Otto, discloses a septic tank discharge port baffle arrangement for a metal drum septic tank of the type that receives toilet discharge directly in at the top.

A semi-cylindrical conduit, secured to the tank wall on each side of the port, extends vertically lengthwise from above the port to below the liquid level which is determined by the lower edge of the port. Two inclined plates, each secured by one of its side edges to the wall below the semi-cylindrical conduit, are wider than the radius of the conduit, so that they extend further from the wall than the conduit. The plates are oppositely disposed, upwardly and outwardly inclined in a T arrangement, and slightly spaced one from the other. Their top edges extend out as far on each side of the port as the conduit.

The plates thus form a V which directs rising sediment and gasses in a direction that is parallel to the wall and to the right and left of the opening formed at the bottom of the semi-cylindrical conduit and the tank wall, and the plates also form a funnel which directs falling sludge that may pass between the plates and the conduit, in a direction that is down parallel to the wall and to the right or left depending upon the orientation of the plates in the T.

For a concrete septic tank with a molded tee outlet, J. Quina, in U.S. Pat. No. 3,630,370, patented Dec. 28, 1971, discloses a deflector for use at the outlet end of the tank.

It is a biconic deflector, with its central axis concentric with that of the vertical pipe of the tee. It is located immediately below the bottom end of the vertical pipe which extends down into the liquid, held in place below the pipe by suitable holding means inserted into the bottom of the pipe. The biconic deflector has a top and a bottom apex, each with a cross sectional area that is smaller than that of the bottom end of the pipe, and its base is of a larger cross sectional area than that of the bottom end of the pipe.

Gas bubbles resulting from fermentation, which rise in the liquid and carry particulate matter, are deflected outward by the lower cone, so that they flow up toward the region around the vertical pipe. The bottom end of the vertical pipe has unencumbered space about its periphery so that gas bubbles carrying solid particles will flow around and upward rather than dam up against an encumbrance and back up into the pipe.

In lieu of the axially oriented biconic deflector, a corbel, which is an upward and outward stepped projection, is molded on the concrete wall below the bottom end of the pipe. Bubbles flowing over the lower sloped face of the corbel are directed away from the wall and pipe hanging in front of the wall, as they move upward. Bubbles flowing over the top slope of the corbel, travel to the unencumbered space around the vertical pipe, and upward.

U.S. Pat. No. 4,334,991, patented June 15, 1982 by E. Beede, discloses a septic tank baffle for concrete septic tanks, that is lighter and easier to install than concrete baffles.

Made from plastic such as polypropylene or the equivalent, about one eighth of an inch thick, the baffle takes the shape of a three sided trough which extends lengthwise from the top of the tank, flush with the cover, to a location below the level of liquid in the tank. It is positioned over the inlet or outlet port of the tank, to block lateral flow. The plastic is lighter in weight and less brittle than a concrete baffle.

For ease of installaton, the baffle has a pair of hanger straps which are parallel with the top edges of the side walls of the baffle where they are attached to it, extends beyond the walls and twists down at a distance from the walls, so that the baffle can be hung from the top of the septic tank wall which has the port.

The baffle is further fastened to the tank wall having the port, by a plurality of independent flanges which are attached to the baffle side walls, and are bent, extending away from the baffle wall edges. The flanges are resilient so that when they are anchored to the septic tank wall the side edges of the baffle are in tight linear sealing engagement with the wall of the septic tank.

In an alternate embodiment, the baffle is in the form of a flat plate instead of trough shaped, and extends to the tank walls which are on either side of the wall containing the port. The straps and flanges then attach to those tank walls.

SUMMARY OF THE INVENTION

Most communities now require a baffle at both the inlet and the outlet ports of a septic tank.

One object of the present invention is to provide a septic tank baffle which operates as either an inlet port or outlet port baffle.

Another object of the present invention is to provide a septic tank baffle that can be cut in the field to fit different tank depths.

Another object is to provide a baffle that can be assembled in the field and be quickly, easily and permanently installed in a tank.

Still another object of the invention is to provide a baffle that disturbs flow, and guides it downward and forward when used as an inlet port baffle, and that reduces the percentage of particulate matter carried with the liquid through the outlet port when used as an outlet port baffle.

Other objects and advantages will become apparent from the ensuing description of the invention.

In accordance with the invention there is provided a baffle for mounting over a port in a septic tank wall. The baffle includes a conduit for generally vertical mounting. The conduit has an open back side for mounting toward the wall, and has a front side, an open top end and an open bottom end.

A first, curved wall, generated on an axis which runs the length of the conduit, is located at the front side. On each side of the curved wall is a generally flat, straight second wall, parallel with the axis, extending the length of the curved wall, and joined by one edge with an edge of the curved wall in a joint that is parallel with the axis.

A pair of generally flat, straight third walls, generally parallel with the axis. Each extends the length of the second walls and is angled from the second walls, each third wall is joined by one edge with an edge of a second wall in a joint that is parallel with the axis.

A pair of generally flat, straight, coplanar fourth walls, generally parallel with the axis. Each extends the length of the third walls and is angled from them. Each fourth wall is joined by one edge with an edge of a third wall in a joint that is parallel with the axis. The fourth walls are for mounting the conduit to the wall of the tank.

The baffle further includes a flat fifth wall and a sixth wall each joined to the other along one edge and angled one from the other. Means are provided for attaching the fifth wall to the back of the conduit, near the bottom end of the conduit, parallel to the fourth walls, so that the sixth wall extends below the bottom end of the conduit. The sixth wall has a surface which extends beyond extension of the first, second and third walls, and that is further from the first wall than it is from the third walls when the fifth wall is attached to the back of the conduit. Preferably, the sixth wall is flat, and the joint defined by the joining of the fifth and sixth walls is held generally perpendicular to the axis.

In one embodiment of the invention, a seventh wall, joins the fourth walls to provide added rigidity to the baffle.

Preferably, the second walls are parallel with the fourth walls, and the third walls are perpendicular to the fourth walls.

The fourth walls have holes within them, near the top end of the conduit for mounting the conduit to the tank wall, and near the bottom end of the conduit for receiving the means for attaching the fifth wall to the back of the conduit.

Anchors are molded in the tank wall in a pattern for alignment with the holes in the fourth walls near the top end of the conduit. The anchors are located in the wall about the port so that the baffle is located over said port when fastener means are inserted into the anchors by way of the holes near the top end of the conduit.

DESCRIPTION OF THE PREFERRED EMBODIMENTS

Figure 1:
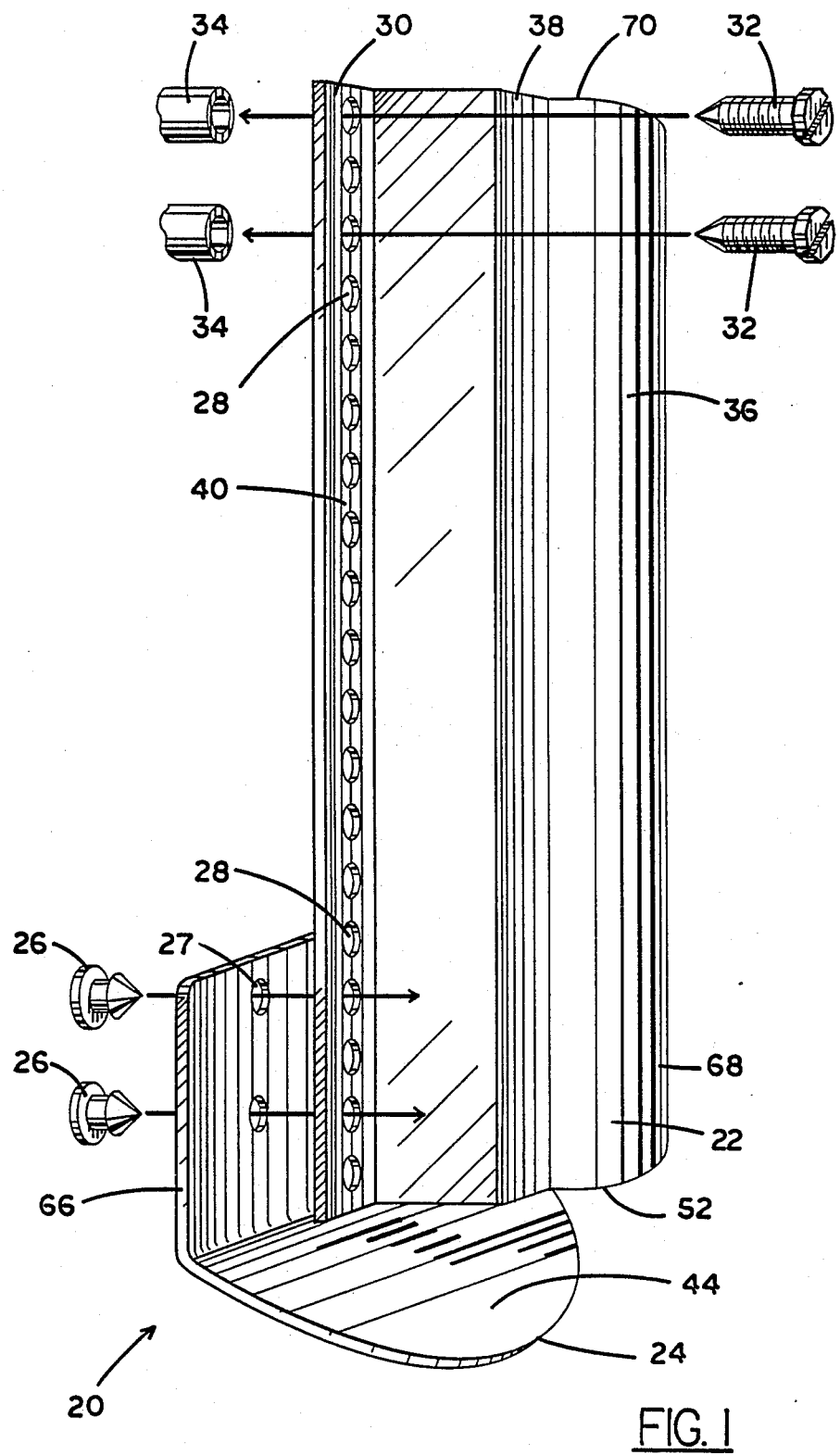
FIG. 1 is an exploded perspective view of a baffle.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring now to the drawings, FIG. 1 shows a baffle 20 according to a preferred embodiment of the invention. Conduit 22 is joined to flap section 24 by snaps 26 through holes 27 in the flap, and fastening holes 28 in the baffle. The snaps preferably are plastic, flat head, one way type which permanently fasten once they are inserted through holes 28. The baffle is about ⅛" thick, preferably made from plastic such as Poly Pro brand, that can withstand long term immersion in septic tank liquids.

Holes 28 also receive screws for attaching the baffle to the tank wall. For example, sheet metal screws 32 are shown, oriented for insertion through holes 28 into plastic anchor means 34 which are moled into the concrete wall. The plastic anchor means are independent in nature, or comprise screw-receiving anchor portions of a "Polylok Pipe Seal", patent pending, available from United Concrete Products, Inc., Yalesville, CT. Alternatively, concrete fasteners such as concrete nails are driven into the concrete via holes 28.

Conduit 22 is provided in several stock lengths, with holes 28 spaced along its length in mounting strip 30 so that it can be cut to any desired length, and assembled with flow director flap 24 in the field.

Figure 2:
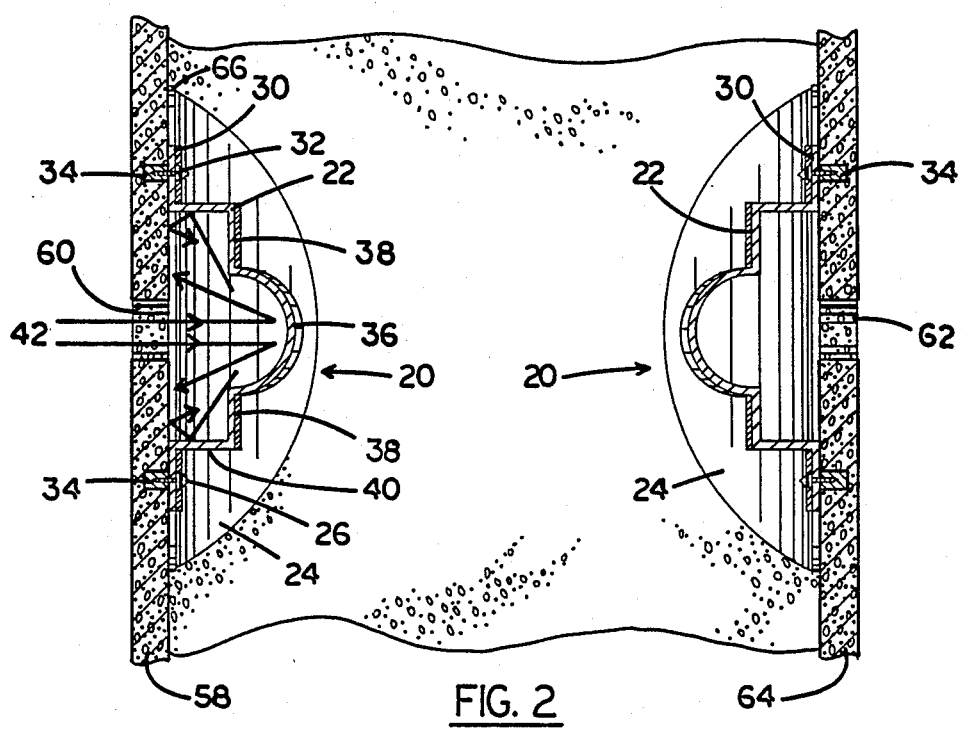
FIG. 2 is a top partial cross section view of baffles mounted on tank walls over inlet and outlet ports in the walls.

The conduit, which extends above and below the level of liquid 46 (FIG. 3) held in the tank, and which is mounted against a tank wall, centered upon an inlet or an outlet port, comprises a profile for controlling flow of liquid entering the inlet port at various flow rates. As seen in FIG. 2, centralized curved portion 36 of baffle 20, mounted on wall 58, over inlet port 60, extending above stored liquid level 46, directs incoming liquid 42 to the right and left of center, while the liquid is generally forced downward by the conduit. Squared troughs formed by parallel walls 38, and perpendicular walls 40 taken with respect to concrete wall 58, receive the directed liquid and prevent generation of columnar counter rotating vortices on each side of curved portion 36.

Figure 3:
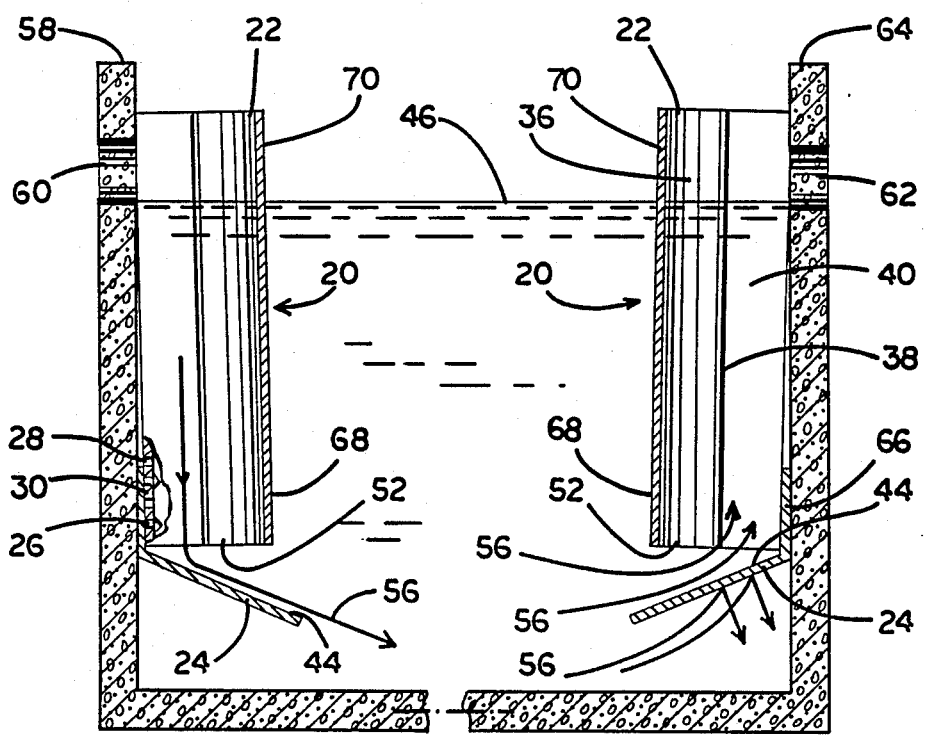
FIG. 3 is a side view with the tank in cross section, of baffles mounted on tank walls having inlet and outlet ports.

Turning to FIG. 3, conduit 22 delivers the controlled flow to surface 44 of flow director flap 24. Flap 24 angles down and away from tank wall 58, and by means of selection of holes 28 for mounting, preferably begins to slope immediately below the horizontal plane which includes opening 52. The portion of the flap below opening 52 extends outward beyond vertical extension of the edges of the walls of the opening. Surface 44 directs flow shown generally by arrow 56, away from wall 58 and to the bottom of the tank where the sediment (not shown) is located.

Continuing toward outlet port 62 in concrete wall 64, liquid flow 56 approaches flap 24 of baffle 20 which is mounted on wall 64, from all directions and from all angles upward and downward.

Flap 24 directs liquid from flow directions having less upward inertia and carrying minimum sediment, into lower opening 52 of conduit 22. Flows rising at a sharper angle than that of flap 24 are blocked from entry to opening 52. Those which are directed into opening 52 by surface 44 of the flap, move against wall 64 or perpendicular walls 40, which guide flow upward towards surface 46, whereupon curved portion 36 contributes to focussing flow toward outlet port 62.

Vertical portion 66 of flap 24 provides rigidity to lower portion 68 of conduit 22 so that walls 40 and 38 retain their angular relationship with one another and to the tank wall, as the upper portion 70 of the conduit which is attached to the wall obtains rigidity from the wall.

Although the conduit has been described as being open at the back, alternatively it is made with a back wall (not shown) that joins mounting strips 30 for additional rigidity.

The angular relationship of walls 40 and 38 with respect to the tank wall need not be parallel and perpendicular respectively, but may vary up to 30 degrees from those relationships, as long as the walls extend about a curved portion in cross section.

Permanent installation of a baffle constructed according to the present invention may be accomplished in less than three minutes, by measuring the depth of the septic tank from the inlet or outlet port, cutting the conduit to the desired baffle length, less the vertical distance between the lowest point on the flap and the lower opening of the conduit when the flap is installed on the conduit, snapping the flap onto the lower end of the conduit, and screwing or nailing the upper end of the conduit over the desired port.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A baffle for a septic tank port in a wall of said tank, said baffle comprising:
   a conduit and means for mounting said conduit generally vertically in said tank, on said wall, over said port, said conduit having a back side for mounting toward said wall, a front side, an open top end and an open bottom end, and a length extending between said open top and to said open bottom end,
   said front side comprising a first, curved wall generated on an axis which runs the length of the conduit, said conduit further comprising,
   a pair of generally flat, straight second walls, one on each side of the first wall, generally parallel with said axis and extending the length of the first wall, each second wall joined by one edge of the first wall in a joint that is parallel with said axis,
   a pair of generally flat, straight third walls, generally parallel with said axis and extending the length of the second walls and angled from said second walls, each third wall joined by one edge with an edge of a second wall in a joint that is parallel with said axis,
   said means for mounting comprising a pair of generally flat, straight, coplanar fourth walls for mounting said conduit to said wall of said tank, said fourth walls being generally parallel with said axis, extending the length of the third walls and angled from said third walls, each fourth wall joined by one edge with an edge of a third wall in a joint that is parallel with said axis,
   said baffle further comprising a flat fifth wall and a sixth wall joined to each other along one edge and angled with respect to each other,
   means for attaching the fifth wall to the back side of the conduit, near the bottom end of the conduit, parallel to the fourth walls, so that the sixth wall extends below the bottom end of the conduit, said sixth wall having a surface which extends beyond extension of the first, second and third walls when the fifth wall is attached to the back of the conduit, said surface being further from the first wall than it is from the third walls.

2. The baffle described in claim 1 further comprising: a seventh wall, joining said fourth walls.

3. The baffle described in claim 1, further comprising: said sixth wall being flat and said joint defined by the joining of said fifth and sixth walls being generally perpendicular to said axis.

4. The baffle described in claim 1, further comprising: said second walls being parallel with said fourth walls.

5. The baffle described in claim 4, further comprising, said third walls being generally perpendicular to said fourth walls.

6. The baffle described in claim 1, further comprising: said fourth walls defining holes within said fourth walls near the top end of the conduit for mounting the conduit to the tank wall, and near the bottom end of the conduit for receiving said means for attaching the fifth wall to the back of the conduit.

7. The baffle described in claim 6, further comprising anchors, molded in the tank wall in a pattern for alignment with the holes in said fourth walls near the top end of the conduit, located in relation to said port so that said baffle is located over said port when fastener means are inserted into the anchors by way of said holes near the top end of the conduit.

* * * * *